June 26, 1956  E. J. BEACH  2,751,800
BORING DEVICE FOR ELLIPTICAL OR THE LIKE OPENINGS
Filed July 17, 1953  3 Sheets-Sheet 1
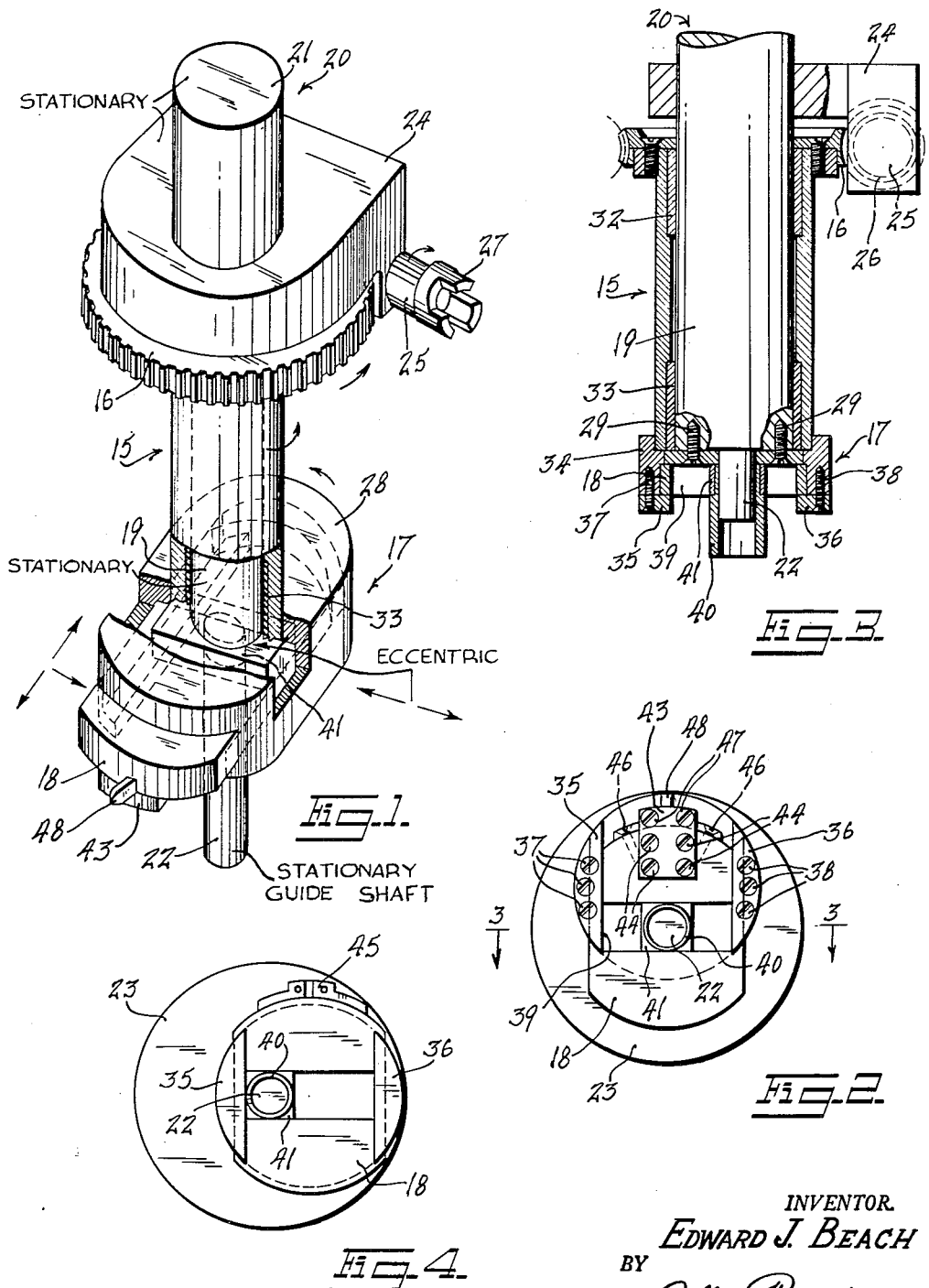
INVENTOR.
EDWARD J. BEACH
BY
ATTORNEY June 26, 1956         E. J. BEACH         2,751,800
BORING DEVICE FOR ELLIPTICAL OR THE LIKE OPENINGS
Filed July 17, 1953         3 Sheets-Sheet 2
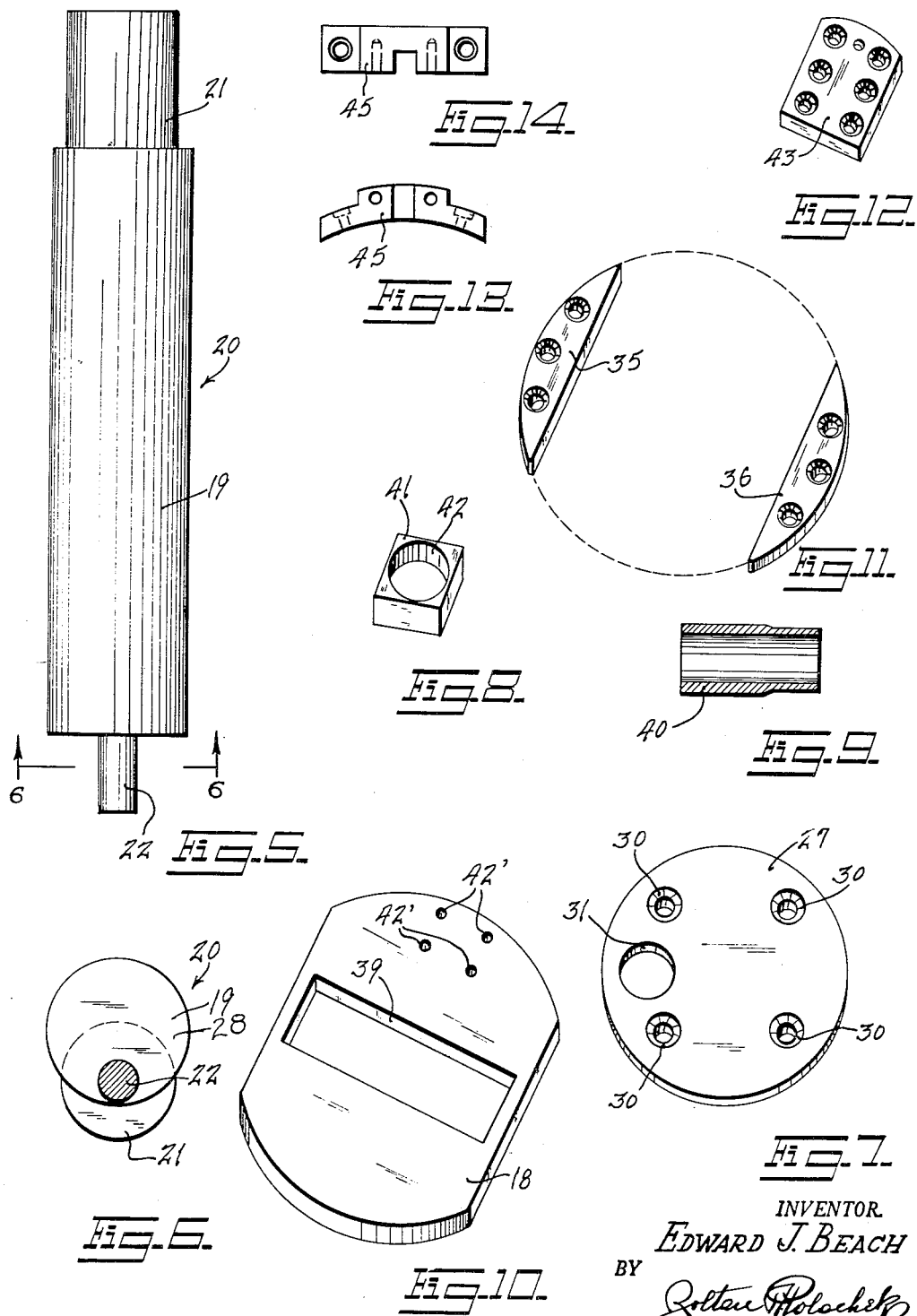
INVENTOR.
EDWARD J. BEACH
BY
ATTORNEY June 26, 1956   E. J. BEACH   2,751,800
BORING DEVICE FOR ELLIPTICAL OR THE LIKE OPENINGS
Filed July 17, 1953   3 Sheets-Sheet 3

INVENTOR.
EDWARD J. BEACH
BY
Zoltan A. Polechek
ATTORNEY

United States Patent Office 2,751,800
Patented June 26, 1956

2,751,800

BORING DEVICE FOR ELLIPTICAL OR THE LIKE OPENINGS

Edward J. Beach, Brooklyn, N. Y., assignor to Beach-Russ Company, Brooklyn, N. Y., a corporation of New York Application July 17, 1953, Serial No. 368,591

9 Claims. (Cl. 77—61)

This invention relates to new and useful improvements in cylinder boring attachments.

More particularly, the present invention proposes the construction of an improved elliptical boring attachment for boring cylinders out-of-round on lathes, horizontal and vertical boring machines, milling machines and other cutting or drilling machines, such out-of-round cylinders being used in the manufacture of vacuum pumps, rotary vane pumps, certain steam cylinders and the like, such cylinders formerly being bored by individual cuts on both halves of the cylinder taken at different radii.

Another object of the present invention proposes forming an attachment which will bore the interior wall of a cylinder oblong or elliptical instead of circular in cross-sectional form without the necessity of either using a cam boring machine or of shifting the cylinder on the boring machine to take a series of cuts on different radii and without the necessity of draw-filing or scraping down points left where one bore leaves another when such a series of cuts are taken.

Still further, the present invention proposes constructing the attachment with a crank having axially aligned end or shaft portions and an axially offset central portion so that by simple changes in the crank, cylinders may be bored more or less out-of-round and still have the same measurement across shaft centers in all directions.

As a further object, the present invention proposes constructing the attachment with a boring head having a movable slide actuated by such stationary crank extending through a rotatable spindle and anchored with the boring head set at shaft center while the center portion of the crank is set at actual cylinder center.

The present invention further proposes mounting a tool plate and tool holder on a slide gate on the attachment removably to hold a tool for cutting a Limacon cross-section in a cylinder wherein the center of the vane always traces a true circle and the polar equation of the quartic curve is $r = a \cos \theta + b$.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view with parts broken away and in section illustrating the attachment of the present invention.

Fig. 2 is an end view of the attachment shown in Fig. 1 as it appears when in use and beginning its cutting operation in a cylinder.

Fig. 3 is a sectional view taken on line 3—3 of Fig. 2 but omitting the work cylinder.

Fig. 4 is a view similar to Fig. 2 but showing a later stage of the cutting operation.

Fig. 5 is a side view of the crank shown in the several figures.

Fig. 6 is a sectional view taken on line 6—6 of Fig. 5.

Fig. 7 is a perspective view of the bearing plate shown in Figs. 1 to 4, inclusive.

Fig. 8 is a perspective view of the roller shown in Figs. 1 to 4, inclusive.

Fig. 9 is a cross-sectional view of the sleeve shown in Figs. 1 to 4, inclusive.

Fig. 10 is a perspective view of the slide or slide gate shown in the first four figures.

Fig. 11 is a perspective view of the slide gate guide strips shown in Figs. 1 to 4, inclusive.

Fig. 12 is a perspective view of the tool plate shown in Figs. 1 and 2.

Fig. 13 is a plan view of the tool holder shown in Fig. 2.

Fig. 14 is an end view of the tool holder of Figs. 2 and 13.

Figure 15:
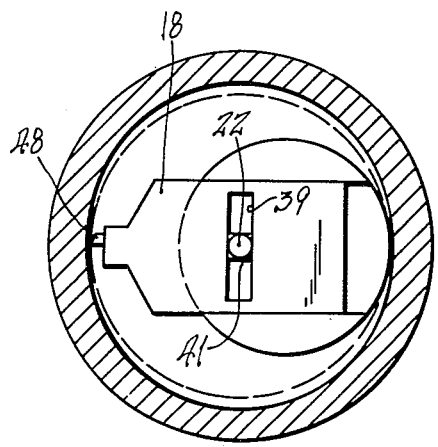
Figs. 15 and 16 are diagrammatical plan views, showing the paths of the parts in boring a cylinder by this device.

Referring more particularly to the drawings, the elliptical boring attachment of the present invention has a rotor or hollow spindle 15 which is cylindrical or tubular in shape. On one end of the spindle is fixed a worm gear 16 and mounted on the other end of the spindle is a boring head 17 with a movable slide 18.

Spindle 15 is rotatably mounted on the central portion 19 of a stationary crank 20, the crank having end portions 21 and 22 extending from each end of the spindle. End portions 21 and 22 of crank 20 are axially aligned and center portion 19 of the crank 20 is axially offset with relation to the end portions 21 and 22. End portion 21 of crank 20 is adapted to be secured to a machine or to any stationary support so that the attachment can be attached to any standard machine or machine tool.

End portion 22 of crank 20 preferably is also anchored but need not necessarily be. The crank 20 being stationary provides a guide for the spindle 15 which is rotatable about it. End portion 21 is adapted to be fixed to a cutting machine or the like with the center portion 19 of the crank 20 axially aligned with the center of the work or work cylinder 23 (see Figs. 2 and 4). While so aligned the boring head 17 is centered on the free or fixed end 22 of crank 20, as will later be more fully described.

A worm shaft bearing block 24 is fixed to the end portion 21 of crank 20 and a worm shaft 25 is rotatably mounted on block 24 with a worm 26 on the shaft 25 meshing with worm gear 16 fixed to the spindle 15. A coupling 27 is provided on the worm shaft 25 for motor drive connection. Preferably the worm shaft 25 is driven slowly and the spindle 15 rotated even more slowly for slow cutting action.

A bearing plate 27 is secured to end surface 28 of center portion 19 on crank 20 by screws 29 which extend through screw holes 30 in the plate. In addition to screw holes 30 (see Fig. 7), plate 27 has a crank end portion passing hole or opening 31 through which extends end portion 22 of crank 20.

Bushings 32 and 33 are provided between the center portion 19 of crank 20 and spindle 15 and the spindle 15 has an end portion 34 to which a pair of spaced guide strips 35 and 36 are secured by screws 37 and 38, respectively. Between these guide strips 35 and 36, the movable slide or slide gate 18 is slidably mounted.

Slide or slide gate 18 has a central slotted opening 39 through it extending crosswise of the slide. The shaft or end portion 22 of crank 20 extends through opening 39 in slide 18 to actuate the slide as the spindle rotates. A sleeve 40 extends around end portion 22 of crank 20 and a roller 41 having a center opening 42 through it is disposed in the slide opening 39 and encircles the sleeve 40 to contact the slide. Roller 41 is poly-sided having flat sides, two of which lie parallel and adjacent to the sides of the slide opening 39 so that the roller 41 may move in the slide opening 39 as the spindle 15 rotates (see Figs. 2 and 4).

At one end of the slide or slide gate 18, screw holes 42' are provided to secure a tool plate 43 of hardened steel by screws 44 (see Fig. 2). Beneath tool plate 43, a tool holder 45 of the same material is secured to the slide 18 by screws 46 and to tool plate 43 by screws 47. A cutting tool 48 is removably held in the tool holder 45.

Figure 16:
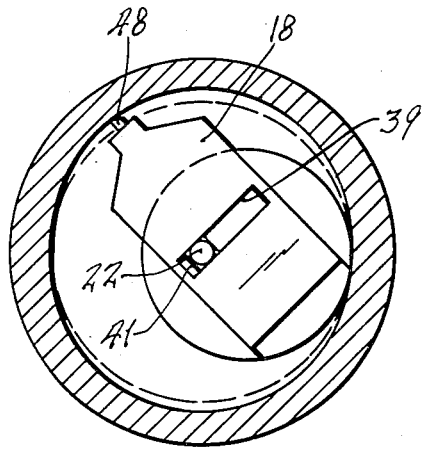

It will be apparent from the foregoing and from Figs. 2 and 4 in particular that the stationary crank 20 can have its center portion set at the actual center of the cylinder to be bored and that the boring head 17 is set at the center of the shaft or end portion 22 of crank 20. By changing the crank dimensions, cylinders may be bored more or less out-of-round and still have the same measurement across shaft centers in all directions. Figs. 15 and 16 illustrate the paths of the parts in boring a cylinder by the new method and apparatus of this invention. Fig. 1 is marked with directional arrows to show the direction of movement of the movable parts and to indicate the stationary ones. As shown in Fig. 1, the entire crank 20 is stationary, its end portions 21 and 22 and its center portion 19 being so held by the lathe or other tool (not shown) in which the crank is mounted. Gear 16 rotates and the spindle 15 rotates with it in the same direction. The eccentric or roller 41 slides back and forth in a crosswise direction as indicated by the directional arrows as the spindle rotates. This in turn moves the slide 18 back and forth in a directional plane 90° to that of the eccentric as shown by the directional arrows. The offset of the end portion 22 of the crank makes the center of the rotor different than the center of the cylinder and results in an elliptical or out-of-round bore as is indicated by the cutting path of the knife or blade as shown in Figs. 15 and 16.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. An attachment for boring cylinders out-of-round on lathes, horizontal and vertical boring machines, milling machines and other cutting or drilling machines comprising a hollow spindle, a boring head with a movable slide having a crosswise slotted opening secured to one end of the spindle, a stationary crank with a center portion extending through and rotatably mounting the spindle, said crank having two axially aligned end portions, one adapted to be fixed to a cutting machine with the center portion of the crank axially aligned with the center of the work cylinder, said boring head being centered on the free end of the crank.

2. An attachment for boring cylinders out-of-round on lathes, horizontal and vertical boring machines, milling machines and other cutting or drilling machines comprising a hollow spindle, a boring head with a movable slide having a crosswise slotted opening secured to one end of the spindle, a crank with a center portion extending through the spindle, said spindle being rotatably mounted on said center portion of the crank, means to rotate the spindle about said center portion of the crank, said crank having two axially aligned end portions, one of said crank end portions being adapted removably to be secured to a fixed support to position the center portion of the crank in axial alignment with the work, said boring head being centered on the free end of the crank.

3. An attachment for boring cylinders out-of-round on lathes, horizontal and vertical boring machines, milling machines and other cutting or drilling machines comprising a hollow spindle, a boring head with a movable slide having a crosswise slotted opening secured to one end of the spindle, a crank with a center portion extending through the spindle, said spindle being rotatably mounted on said center portion of the crank, means to rotate the spindle about said center portion of the crank, said crank having two axially aligned end portions, one of said crank end portions being adapted removably to be secured to a fixed support to position the center portion of the crank in axial alignment with the work, said boring head being centered on the free end of the crank, said free end of the crank extending through the slide to actuate it as the spindle rotates.

4. An attachment for boring cylinders out-of-round on lathes, horizontal and vertical boring machines, milling machines and other cutting or drilling machines comprising a hollow spindle, a boring head with a movable slide secured to one end of the spindle, a crank with a center portion extending through the spindle, said spindle being rotatably mounted on said center portion of the crank, means to rotate the spindle about said center portion of the crank, said crank having two axially aligned end portions, one of said crank end portions being adapted removably to be secured to a fixed support to position the center portion of the crank in axial alignment with the work, said boring head being centered on the free end of the crank, said slide having a central slotted opening therethrough and said free end of the crank extending through said opening to actuate the slide as the spindle rotates.

5. An elliptical boring attachment comprising a crank having axially aligned end portions adapted to be anchored and an axially offset center portion, a hollow spindle rotatably mounted on said center portion of the crank, means at one end of the spindle to rotate it, a boring head fixed to the other end of the spindle, said boring head having a bearing plate fixed to the crank with one end portion of the crank extending therethrough, a pair of spaced guide strips on the bearing plate, a slide gate slidably mounted in the guide strips, means on the slide gate removably to hold a cutting tool, said slide gate having a central slotted opening extending through it crosswise thereof with the adjacent end portion of the crank extending through said opening, and a poly-sided roller with a sleeve extending therefrom slidably mounted in the slide gate opening and over the end of the crank extending through said opening.

6. An elliptical boring attachment comprising a crank having axially aligned end portions adapted to be anchored and an axially offset center portion, a hollow spindle rotatably mounted on said center portion of the crank, means at one end of the spindle to rotate it, a boring head fixed to the other end of the spindle, said boring head having a bearing plate fixed to the crank with one end portion of the crank extending therethrough, a pair of spaced guide strips on the bearing plate, a slide gate slidably mounted in the guide strips, means on the slide gate removably to hold a cutting tool, said slide gate having a central slotted opening extending through it crosswise thereof with the adjacent end portion of the roller with a sleeve extending therefrom slidably mounted in the slide gate opening and over the end of the crank extending through said opening, said means on the slide gate removably to hold a cutting tool being a tool plate and a tool holder removably secured to the slide gate at one end thereof.

7. An elliptical boring attachment comprising a crank having axially aligned end portions adapted to be anchored and an axially offset center portion, a hollow spindle rotatably mounted on said center portion of the crank, means at one end of the spindle to rotate it, a boring head fixed to the other end of the spindle, said boring head having a bearing plate fixed to the crank with one end portion of the crank extending therethrough, a pair of spaced guide strips on the bearing plate, a slide gate slidably mounted in the guide strips, means on the slide gate removably to hold a cutting tool, said slide gate having a central slotted opening extending through it crosswise thereof with the adjacent end portion of the crank extending through said opening, and a poly-sided roller with a sleeve extending therefrom slidably mounted in the slide gate opening and over the end of the crank extending through said opening, said means at one end of the spindle to rotate it being a worm gear fixed to the spindle, a worm shaft bearing block fixed to one end of the crank, a worm shaft rotatably mounted on said block, a worm on said worm shaft meshing with the worm gear fixed to the spindle, and a coupling on said worm shaft for motor drive connection.

8. An elliptical boring attachment comprising a crank having axially aligned end portions adapted to be anchored and an axially offset center portion, a hollow spindle rotatably mounted on said center portion of the crank, means at one end of the spindle to rotate it, a boring head fixed to the other end of the spindle, said boring head having a bearing plate fixed to the crank with one end portion of the crank extending therethrough, a pair of spaced guide strips on the bearing plate, a slide gate slidably mounted in the guide strips, means on the slide gate removably to hold a cutting tool, said slide gate having a central slotted opening extending through it crosswise thereof with the adjacent end portion of the crank extending through said opening, and a poly-sided roller with a sleeve extending therefrom slidably mounted in the slide gate opening and over the end of the crank extending through said opening, said means on the slide gate removably to hold a cutting tool being a tool plate and a tool holder removably secured to the slide gate at one end thereof, said means at one end of the spindle to rotate it being a worm gear fixed to the spindle, a worm shaft bearing block fixed to one end of the crank, a worm shaft rotatably mounted on said block, a worm on said worm shaft meshing with the worm gear fixed to the spindle, and a coupling on said worm shaft for motor drive connection.

9. In a cylinder boring attachment, a stationary crank having two axially aligned end portions and an axially offset center portion, a spindle rotatably mounted on said center portion of the crank, a boring head with a movable slide mounted on the end of the spindle and over one end of the crank, said boring head being set at the center of said end of the crank and the center portion of the crank being set at the actual center of the cylinder to be bored.

References Cited in the file of this patent

UNITED STATES PATENTS 743,293     Knight et al. _____ Nov. 3, 1903